(12) United States Patent
Biskeborn et al.

(10) Patent No.: US 7,480,117 B2
(45) Date of Patent: Jan. 20, 2009

(54) HIGH AREAL DENSITY TAPE HEAD

(75) Inventors: Robert G. Biskeborn, Hollister, CA (US); Wayne I. Imaino, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 64 days.

(21) Appl. No.: 11/609,725

(22) Filed: Dec. 12, 2006

(65) Prior Publication Data

US 2008/0137235 A1    Jun. 12, 2008

(51) Int. Cl.
    *G11B 5/584* (2006.01)
(52) U.S. Cl. .................. 360/77.12; 360/71
(58) Field of Classification Search .......... None
    See application file for complete search history.

(56) References Cited

U.S. PATENT DOCUMENTS

| | | | |
|---|---|---|---|
| 5,027,245 A | 6/1991 | Nagata et al. | |
| 6,545,834 B1* | 4/2003 | Melbye ................... | 360/71 |
| 6,563,659 B1* | 5/2003 | Fasen ..................... | 360/71 |
| 6,781,784 B2* | 8/2004 | Peterson ................ | 360/77.12 |
| 6,992,857 B2* | 1/2006 | Knowles et al. ........ | 360/77.12 |
| 6,999,268 B2* | 2/2006 | Hoerger ................. | 360/77.12 |
| 7,154,691 B2* | 12/2006 | Girvin et al. ........... | 360/121 |
| 7,193,812 B2* | 3/2007 | Eaton .................... | 360/77.12 |
| 2003/0048563 A1 | 3/2003 | Magnusson et al. | |
| 2005/0134991 A1 | 6/2005 | Hansen et al. | |
| 2005/0168865 A1* | 8/2005 | Simmons et al. ...... | 360/77.12 |
| 2006/0092547 A1* | 5/2006 | Kawakami et al. .... | 360/77.12 |
| 2007/0047142 A1* | 3/2007 | Biskeborn .............. | 360/129 |
| 2007/0047146 A1* | 3/2007 | Biskeborn et al. ..... | 360/240 |
| 2008/0030886 A1* | 2/2008 | Biskeborn et al. ..... | 360/75 |

FOREIGN PATENT DOCUMENTS

| | | |
|---|---|---|
| JP | 02-094019 | 4/1990 |
| JP | 10-064031 | 3/1998 |

* cited by examiner

*Primary Examiner*—Hoa T Nguyen
*Assistant Examiner*—James L Habermehl
(74) *Attorney, Agent, or Firm*—Walter W. Duft; Jeffrey P. Aiello

(57) ABSTRACT

A tape head designed for transducing data on a magnetic recording tape that is subject to tape dimensional changes. The tape head includes two or more arrays of transducer elements having different transducer spacing distances corresponding to different track spacing distances to be transduced. One of the transducer arrays may be used for transducing the tape under nominal tape track spacing conditions. Another transducer array may be used for transducing the tape when the tape track spacing is reduced due to the tape shrinkage. Still another transducer array may be used for transducing the tape when the tape track spacing is enlarged due to tape expansion.

5 Claims, 16 Drawing Sheets

HIGH AREAL DENSITY TAPE HEAD

BACKGROUND OF THE INVENTION

1. Field of the Invention

This invention relates to tape drive data storage systems. More particularly, the invention is directed to thin film tape heads for reading and writing data on magnetic recording tape.

2. Description of the Prior Art

Thin film tape heads for magnetic information storage systems (e.g., tape drives) have been constructed using thin film fabrication techniques that are similar to those used in the manufacture of disk drive transducers. In a typical tape head constructed for linear recording (i.e., with data tracks oriented in the direction of tape movement) there are two or more adjacently mounted transducer modules. Each module comprises a linear array of reader and/or writer transducer elements arranged in a cross-track direction that is perpendicular to the direction of tape movement. Each transducer element in a given transducer array is positioned to write or read a separate longitudinal track on the tape. This arrangement is shown in FIG. 1, which depicts a transducer module "M" having an array of thin film transducer elements "E" whose gaps "G" engage a tape "T" in alignment with tracks "TR" that extend in the direction of tape movement "D. In a "piggy back" design (see FIG. 2A), the transducer array "E" would comprise a write transducer "W" and a closely spaced read transducer "R" at each track position. In an interleaved design (see FIG. 2B), the transducer array "E" would comprise alternating read and write elements "R" and "W." In each design, the transducer array "B" may also include a pair of servo read transducers "SR" that align with servo tracks "ST" used for head positioning.

As shown in FIG. 3, the module "M" of FIG. 1 can be secured to a mounting block "MB" in association with a complimentary tape head "M'" comprising either piggy back or interleaved read and write elements. The resultant assembly, which may be referred to as a "tape head," will have read/write element pairs that are aligned in the trackwise direction of the tape "T." In the piggy back design, there will be two read/write element pairs per track (see FIG. 4A). In the interleaved design, the read and write elements of each module "M" and "M'" will be arranged so that there is one read element and one write element for each track (see FIG. 4B). The dual module arrangement allows data recording (and playback) to be performed in both tape directions and provides conventional read-while write capability in which data written to the tape "T" is immediately read back and checked for errors. Other conventional tape head designs include heads in which all of the data transducer elements are read elements or write elements. Read-while write capability may then be achieved by combining a read-only module and a write-only module in a single tape head to provide trackwise-aligned read and write element pairs. As shown in FIG. 5, bi-directional recording with read-while write capability can be provided by placing a read-only module "M'" between a pair of write-only modules "M."

A characteristic of tape head constructions as described above is that the gap pitch within the transducer array "E" is usually much larger than the gap width, such that for every track being read or written by the array, there will be space between the tracks where no transducing occurs. Thus, for every pair of tracks aligned with adjacent read and write elements "R" and "W," there is inter-track white space on the tape "T" that is not transduced concurrently with the selected pair. The white space regions can be recorded with data by stepping the tape head in a cross-track direction during multiple transducing passes. Tape tracks can also be written at less than the gap width of the write transducers using a process known as "shingling." According to this technique, the tape head is stepped by less than the write element gap width for each successive transducing pass, such that the edge of a previously written track is overwritten during the next pass, much like shingles on a roof.

Although the foregoing track writing techniques allow data to be densely packed on a tape, a continuing unresolved problem is track misregistration caused by tape dimensional changes between transducing (either reading or writing) operations. For example, the tape "T" may be written with data under one set of temperature and humidity conditions, and then later read following exposure to different environmental conditions. For conventional tape material, the dimensions can change by as much as 0.12%. These tape dimensional changes will widen or narrow the tape track spacing geometry, resulting in track misregistration with the tape head (whose gap spacing geometry is substantially unchanged). Providing a head that is statically rotated to a nominal predetermined angle addresses the misregistration problem because small changes in rotation change the effective track pitch of the transducer array "E." However, this solution requires sophisticated mechanics and skew compensation circuitry.

The track misregistration problem is exacerbated in conventional tape heads due to the relatively large gap spacing of the transducer array "E." which is mandated to a large extent by the size of the transducers themselves. This is due to the fact that for any percentage change in tape dimension, the actual misregistration between written tracks and outermost transducers depends on the span between the transducers. To illustrate, if the transducer array "E" has a transducer element gap pitch of x μm, and the percentage change in tape dimension is 0.12%, the resultant change in the spacing of the tape tracks under the outermost transducer elements of a sixteen transducer array will be 15×0.0012x=0.018x μm. If x is a typical value of 167 μm (for current generation tape heads), then 0.018x=3 μm. This is a large part of the TMR (Track MisRegistration) budget. On the other hand, if the transducer array "E" has a transducer element gap pitch of 0.5x μm, then a 0.12% change in tape dimension will only change the tape track spacing under the outermost transducer elements by 15×0.0006x μm=0.009x. Again assuming x is a typical value of 167 μm, then 0.009x=1.5 μm. The 0.5x gap pitch transducer array will thus experience only half of the tape dimensional change that is experienced by the x gap pitch array, such that track misregistration is less likely. Unfortunately, reducing track pitch using current thin film transducer fabrication techniques is not a trivial challenge due particularly to the size requirements of the write element structures. Absent the use of alternative transducer designs that permit reductions in track pitch (as previously proposed by one of the applicants herein in commonly-owned patent application filings), or the use of complicated head rotation techniques as referred above, there is no conventional technique for dealing with the thermally induced track misregistration.

SUMMARY OF THE INVENTION

The foregoing problems are solved and an advance in the art is obtained by a tape head designed for transducing data on a magnetic recording tape that is subject to tape dimensional changes. The tape head includes two or more arrays of transducer elements having different transducer spacing distances corresponding to different track spacing distances to be transduced. One of the transducer arrays may be used for transducing the tape under nominal tape track spacing conditions. Another transducer array may be used for transducing the tape when the tape track spacing is reduced due to the tape shrinkage. Still another transducer array may be used for transducing the tape when the tape track spacing is enlarged due to tape expansion. Alternatively, the first transducer array can be used and the tape can be stretched longitudinally to reduce the tape track spacing to the nominal tape track spacing.

According to exemplary embodiments disclosed herein, the arrays may be spaced from each other in a cross-track direction or they may be spaced from each other in a direction of tape motion. The arrays may each include one or both of write transducer elements and read transducer elements. The arrays may each further include a pair of servo read transducer elements. The arrays may be supported by a common substrate as part of a tape head module, and plural modules may be provided. For example, the tape head may include a first array group on a first tape head module and a second array group on a second tape head module. In this two-module configuration, the first and second array groups may each comprise read and write transducer elements arranged in one of an interleaved configuration or a piggy back configuration. The tape head may alternatively include a first array group on a first tape head module, a second array group on a second tape head module, and a third array group on a third tape head module. In this three-module configuration, the first and third array groups may comprise write transducer elements and the second array group may comprise read transducer elements. The second tape head module may be disposed between the first and third tape head modules.

The invention in another aspect provides a method for writing data on a magnetic recording tape while accommodating tape dimensional changes The method includes determining a dimensional condition of the tape, as by reading prerecorded servo markings on the tape, and selecting one of the first and second transducer arrays for transducing according to which of the first transducer spacing distance and the second transducer spacing distance most closely corresponds to the tape dimensional condition. A first one of the transducer arrays having a nominal transducer spacing distance may be used for transducing the tape under nominal tape track spacing conditions and a second one of the transducer arrays having a reduced transducer spacing distance may be used for transducing the tape when the tape track spacing is reduced due to tape shrinkage. The tape may also be transduced by the first transducer array when tape track spacing distance is enlarged due to tape expansion while stretching the tape in a longitudinal direction to reduce the enlarged tape track spacing distance to a near nominal tape track spacing distance. Alternatively, a third transducer array having an enlarged transducer spacing distance may be used for transducing the tape when its track spacing distance is enlarged.

The invention in another aspect provides a tape drive. The tape drive includes a tape head for transducing data on a magnetic recording tape that is subject to tape dimensional changes. The tape head includes plural tape head modules, each of which may have a first array of transducer elements having transducer elements spaced from each other by a first transducer spacing distance that corresponds to a nominal tape track spacing distance, a second array of transducer elements spaced from each other by a second transducer spacing distance that corresponds to a reduced tape track spacing distance caused by tape shrinkage, and a third array of transducer elements spaced from each other by a third transducer spacing distance that corresponds to an enlarged tape track spacing distance caused by tape expansion. The arrays may be spaced from each other in a cross-track direction.

BRIEF DESCRIPTION OF THE DRAWINGS

The foregoing and other features and advantages of the invention will be apparent from the following more particular description of exemplary disclosed embodiments, as illustrated in the accompanying Drawings, in which.

DETAILED DESCRIPTION OF EXEMPLARY EMBODIMENTS

Figure 1:
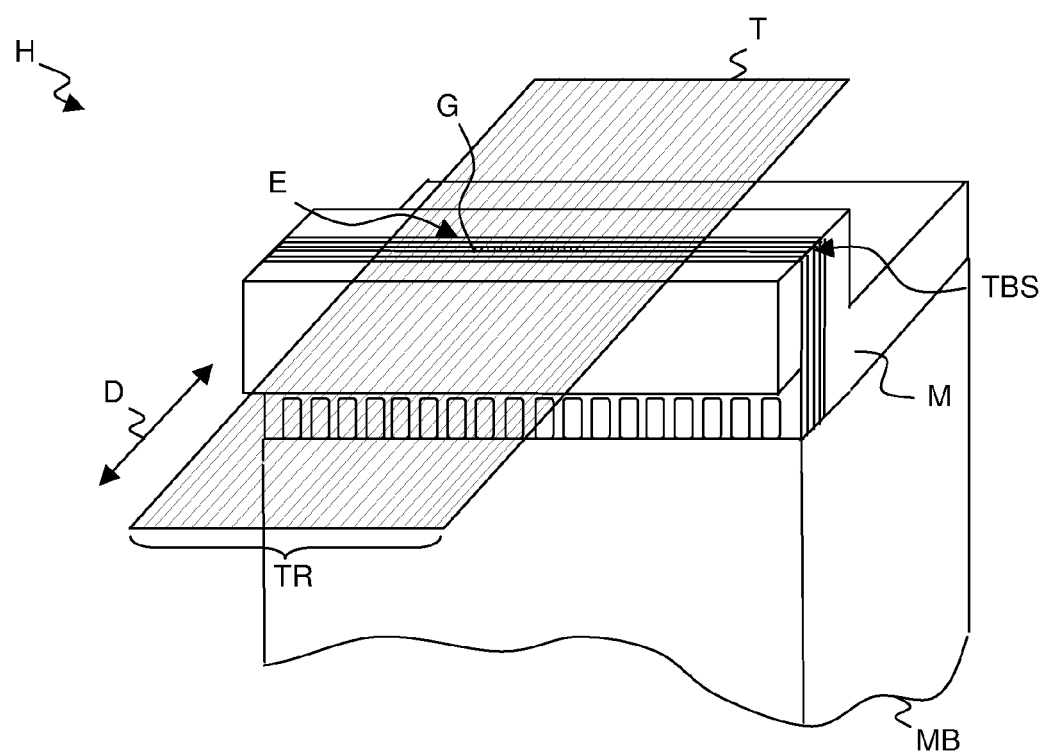
FIG. 1 is a perspective view showing a prior art thin film tape head module.
Figure 2A:
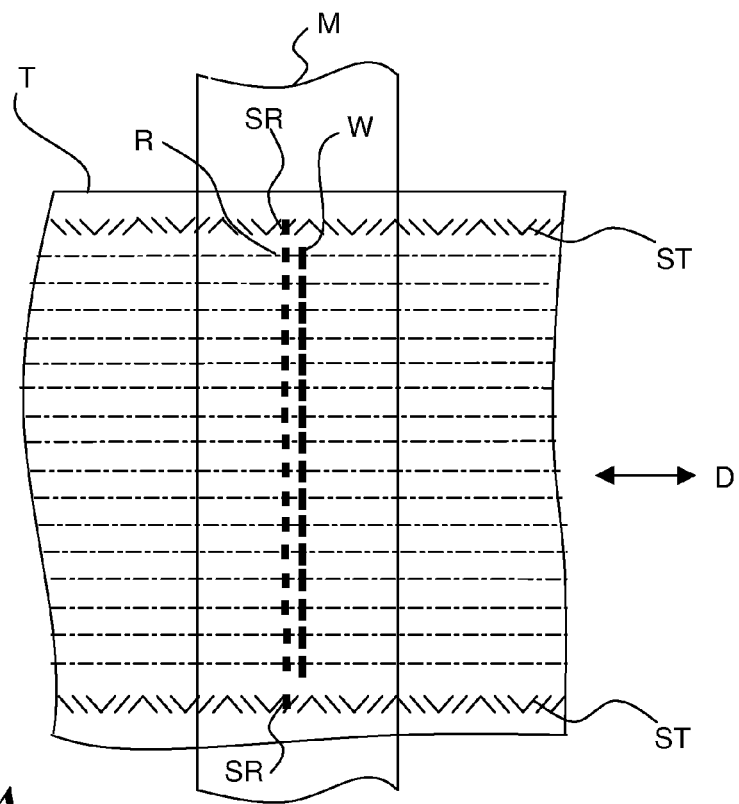
FIG. 2A partial plan view showing a tape bearing surface of a prior art tape head module having a piggy back construction.
Figure 2B:
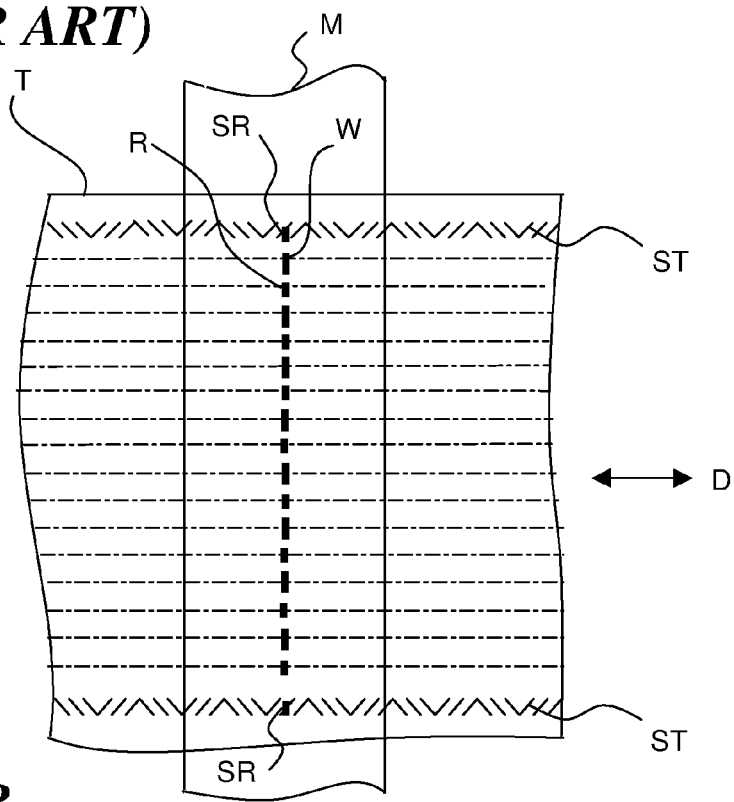
FIG. 2B partial plan view showing a tape bearing surface of a prior art tape head module having an interleaved construction.
Figure 3:
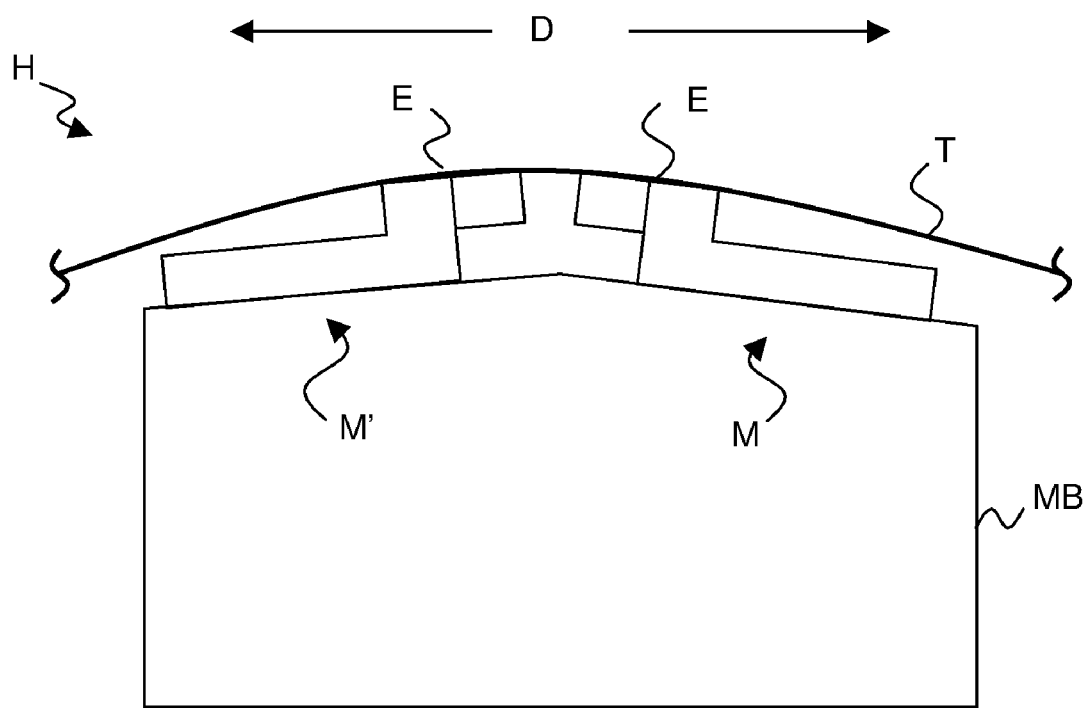
FIG. 3 is a side elevation view showing a pair of the prior art tape head modules of FIG. 1.
Figure 4A:
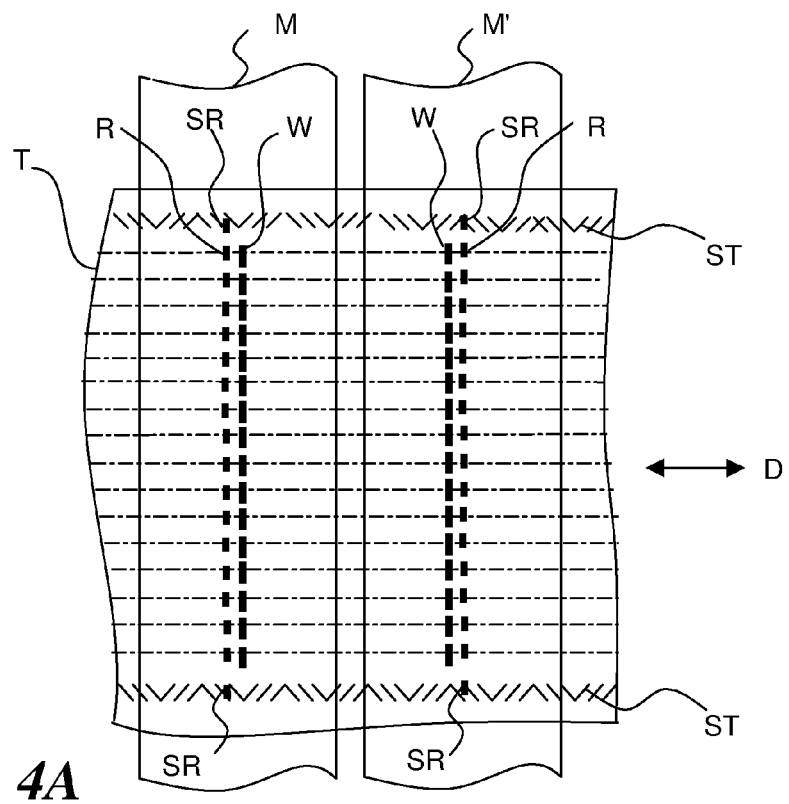
FIG. 4A is a partial plan view showing the tape bearing surfaces of a pair of the prior art piggy back modules of FIG. 2A arranged for transducing a tape.
Figure 4B:
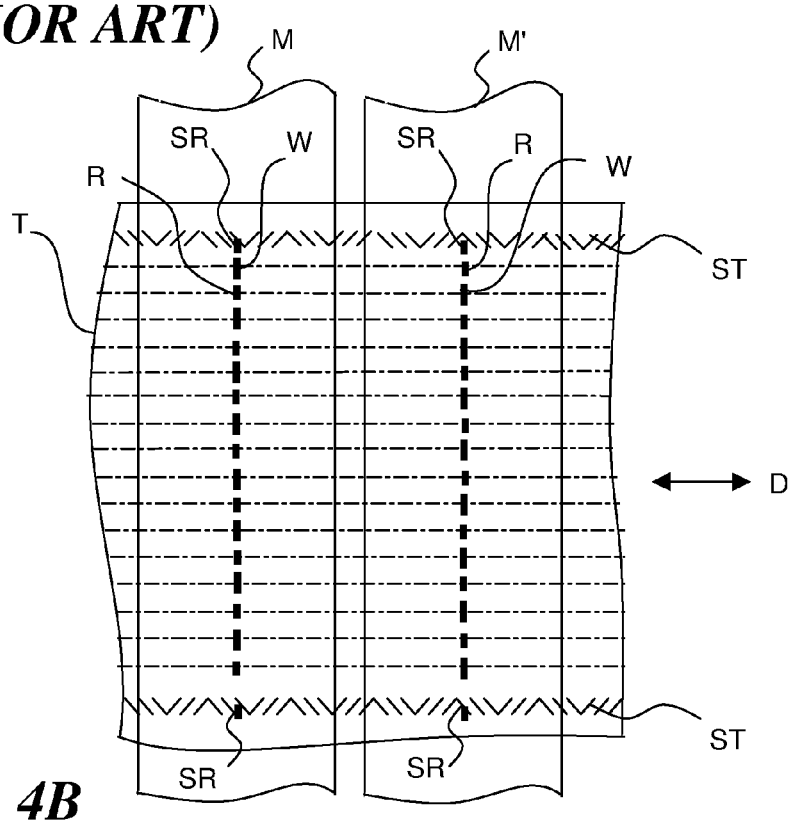
FIG. 4B is a partial plan view showing the tape bearing surfaces of a pair of the prior art interleaved modules of FIG. 2B arranged for transducing a tape.
Figure 5:
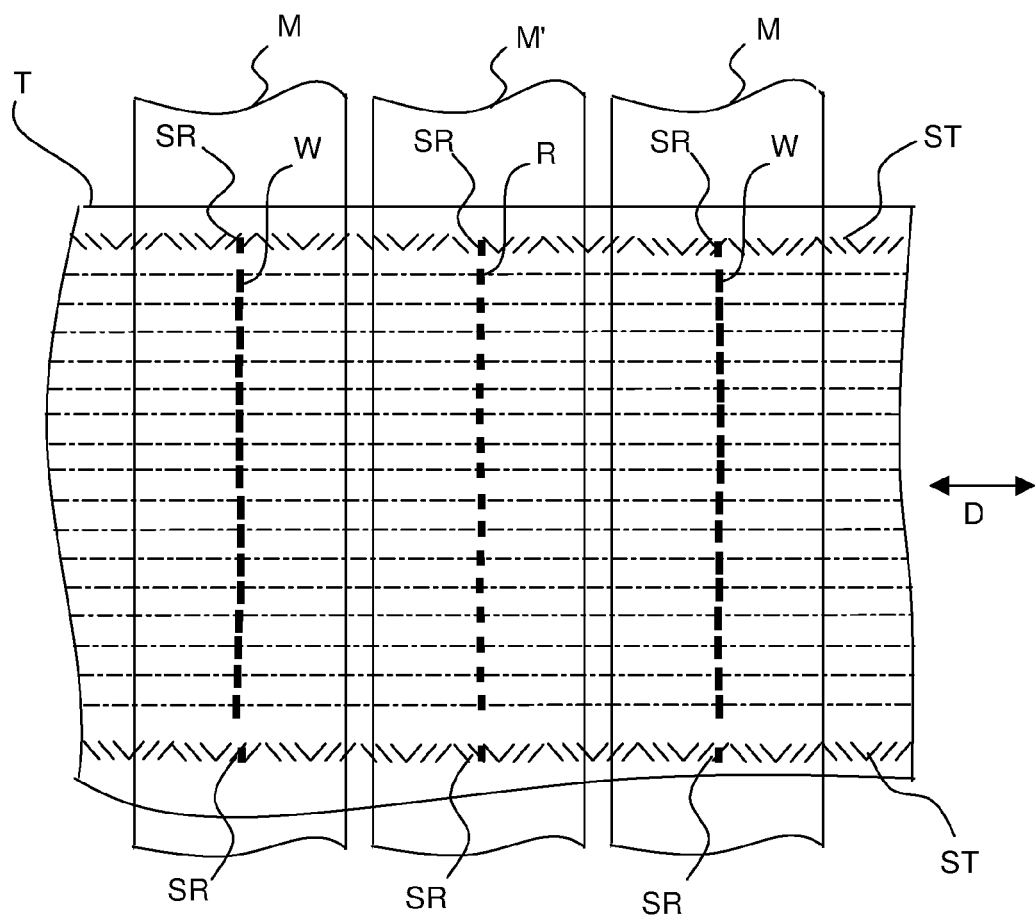
FIG. 5 is a partial plan view showing the tape bearing surfaces of three prior art tape head modules arranged for transducing a tape in a configuration wherein two arrays of write transducers sandwich an array of read transducers.

The invention will now be described by way of exemplary embodiments shown by the drawing figures (which are not necessarily to scale), in which like reference numerals indicate like elements in all of the several views.

Figure 6:
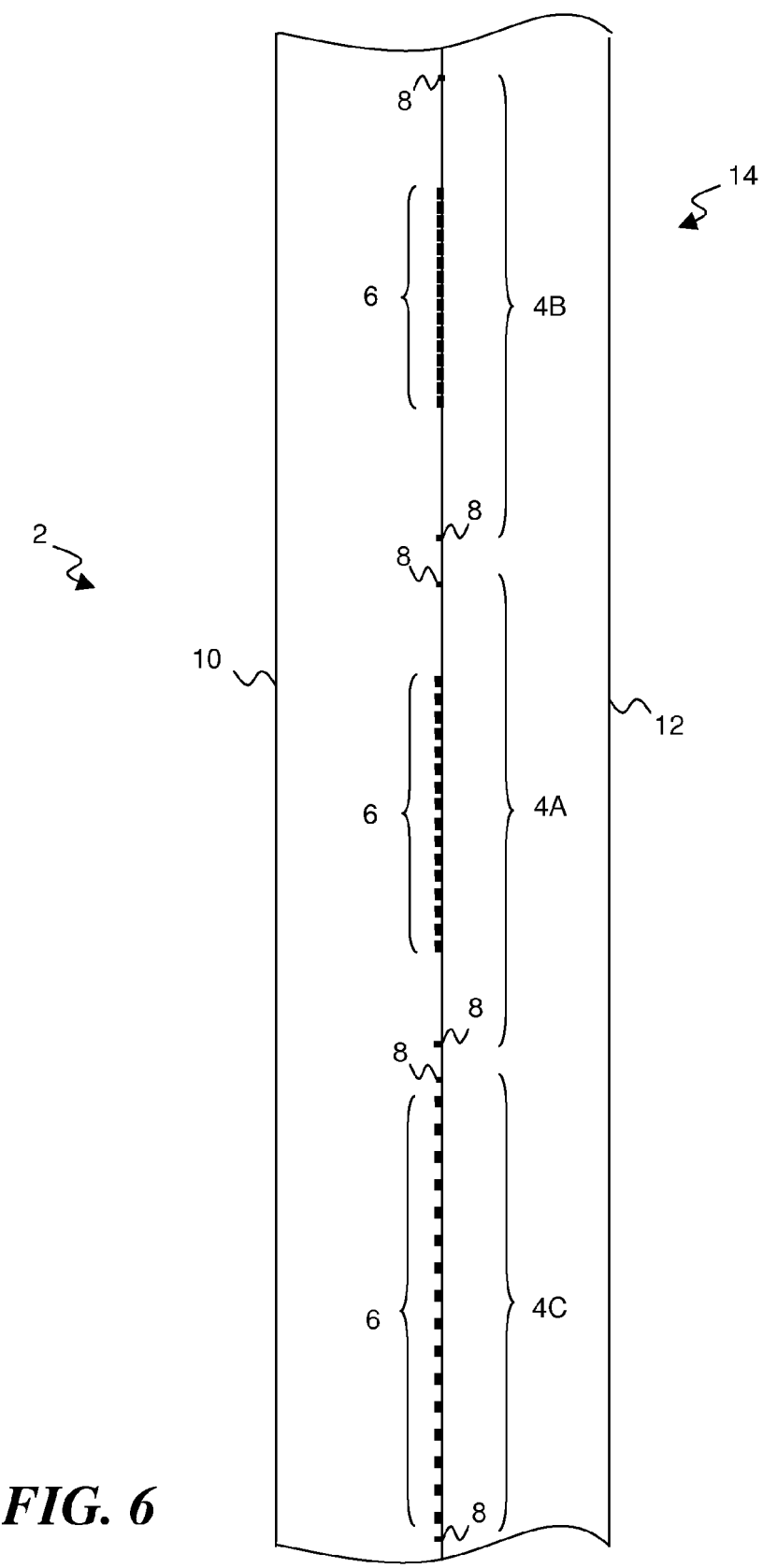
FIG. 6 is a partial plan view showing the tape bearing surface of a tape head module constructed in accordance with an exemplary disclosed embodiment.

Turning now to FIG. 6, a tape head 2 is designed for transducing data on a magnetic recording tape that is subject to tape dimensional changes. The tape head includes two or more arrays of transducer elements having different transducer spacing distances (center-to-center pitch) corresponding to different track spacing distances (center-to-center pitch) to be transduced. One of the transducer arrays 4A has nominal transducer spacing and may be used for transducing the tape under nominal tape track spacing conditions. Another transducer array 4B has reduced transducer spacing and may be used for transducing the tape when the tape track spacing is reduced due to the tape shrinkage. Still another transducer array 4C has enlarged tape track spacing and may be used for transducing the tape when the tape track spacing is enlarged due to tape expansion. Alternatively, the first transducer array 4A can be used and the tape can be stretched longitudinally to reduce the tape track spacing closer to the nominal tape track spacing. This is because changes in tape width are related to changes in tape extension via Poissons ratio, which is typically 0.3-0.5 for a flexible medium such as tape. Each of the arrays 4A, 4B and 4C includes sixteen data transducers 6 for transducing customer data, and a pair of servo read transducers 8 for transducing tape servo tracks. The use of sixteen data transducers is of course arbitrary and it will be appreciated that fewer or more data transducers could be incorporated in each array. It should also be pointed out that the differences in transducer spacing between the transducer arrays 4A and 4C refers to the data transducers 6. The spacing between the two servo transducers 8 of the transducer arrays 4A, 4B and 4C will preferably be the same for each array. The reason for this will be made clear below.

It will be appreciated that the nominal transducer spacing of the transducer array 4A is arbitrary and will depend on design preferences. As described by way of background above, a data track spacing of 167 µm is common for current generation tape heads, and this value may be used for the nominal spacing of the data transducers 6 of the transducer array 4A. If there are sixteen data transducers 6 per array, the data transducers span would be 15×167=2505 µm. The reduced transducer spacing distance of the transducer array 4B and the enlarged transducer spacing distance of the transducer array 4C may be selected according to the anticipated shrinkage and expansion of the tape to be transduced, respectively. This may be determined by experiment. For example, if it is anticipated that the change in cross-track tape dimension will be +/−0.12%, the sixteen data transducers 6 of the array 4B can be spaced so that the data transducer span length is 2505×(1−0.0012)=2502 µm, which is approximately 3 microns less than the length of the nominal data transducer span of the array 4A. The sixteen data transducers 6 of the array 4B can be spaced so that the data transducer span length is 2505×(1+0.0012)=2508 µm, which is approximately 3 microns more than the length of the nominal data transducer span of the array 4A. Note that if the 0.12% change in dimension above is an anticipated worst case condition, the spacing of the arrays 4B and 4C could be less than the 3 micron differential above (e.g., so as to reflect an average or mean change in dimension). It will be appreciated that the differences in transducer spacing of arrays 4A, 4B and 4C are microscopic in scale and are thus greatly exaggerated in FIG. 1. As track spacing reductions become possible in the future, the nominal, reduced and enlarged transducer spacing distances of the arrays 4A, 4B and 4C may well become even smaller.

In the embodiment of FIG. 1, the arrays 4A, 4B and 4C are spaced from each other in a cross-track direction. They may be fabricated on a common substrate 10 using conventional thin film fabrication techniques and materials. A conventional closure 12 may be bonded to the transducer side of the substrate 10 to protect the transducer elements from wear and to optimize the tribological properties of the tape head 2. Electrical lead connections from the transducer elements extend away from the reader into the plane of the drawing sheet, and thus are not visible in FIG. 1. The resultant structure may be referred to as a tape head module 14.

Figure 7:
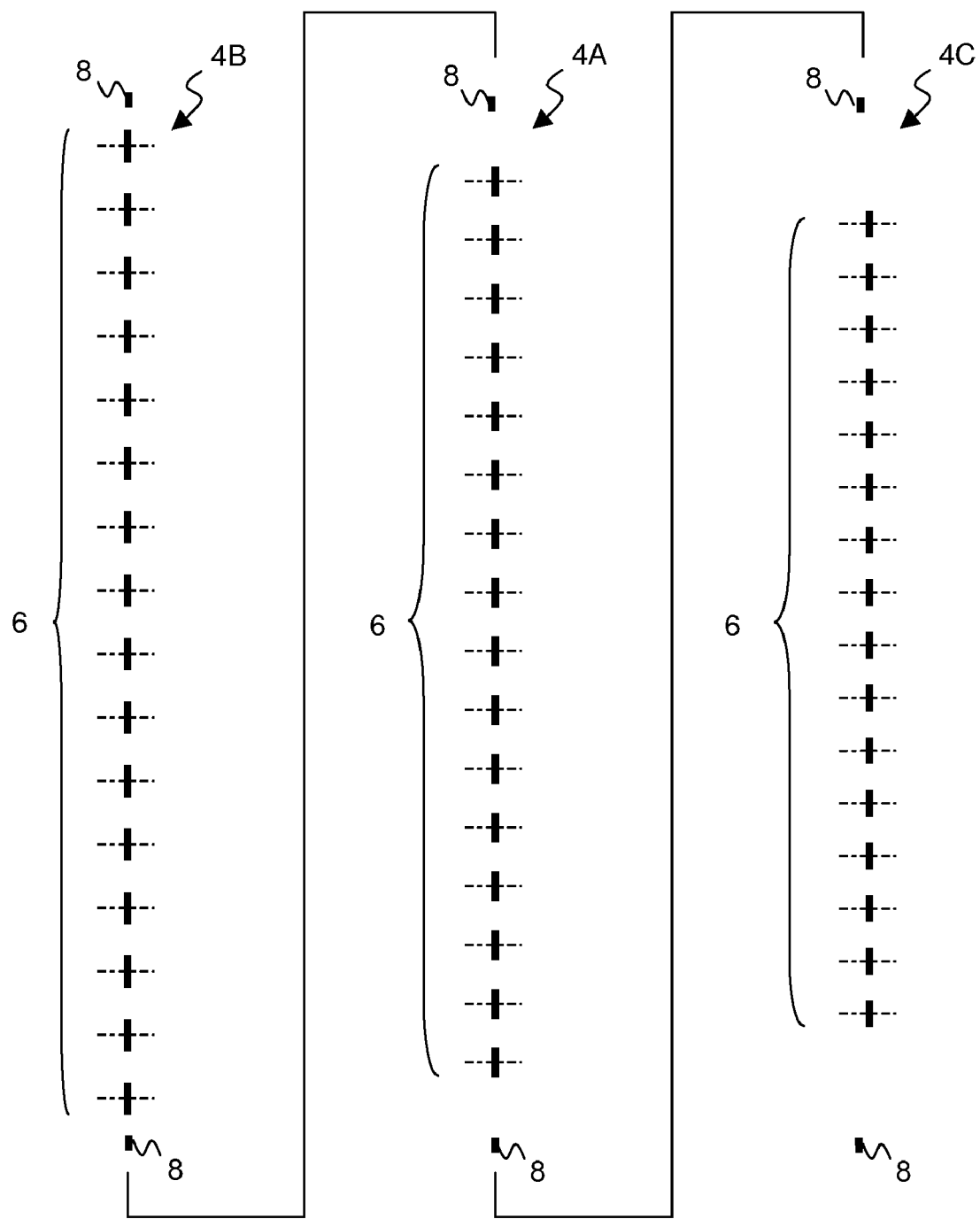
FIG. 7 is an enlarged view of the tape head module of FIG. 6 showing an implementation wherein the module includes arrays of write transducer elements.
Figure 8:
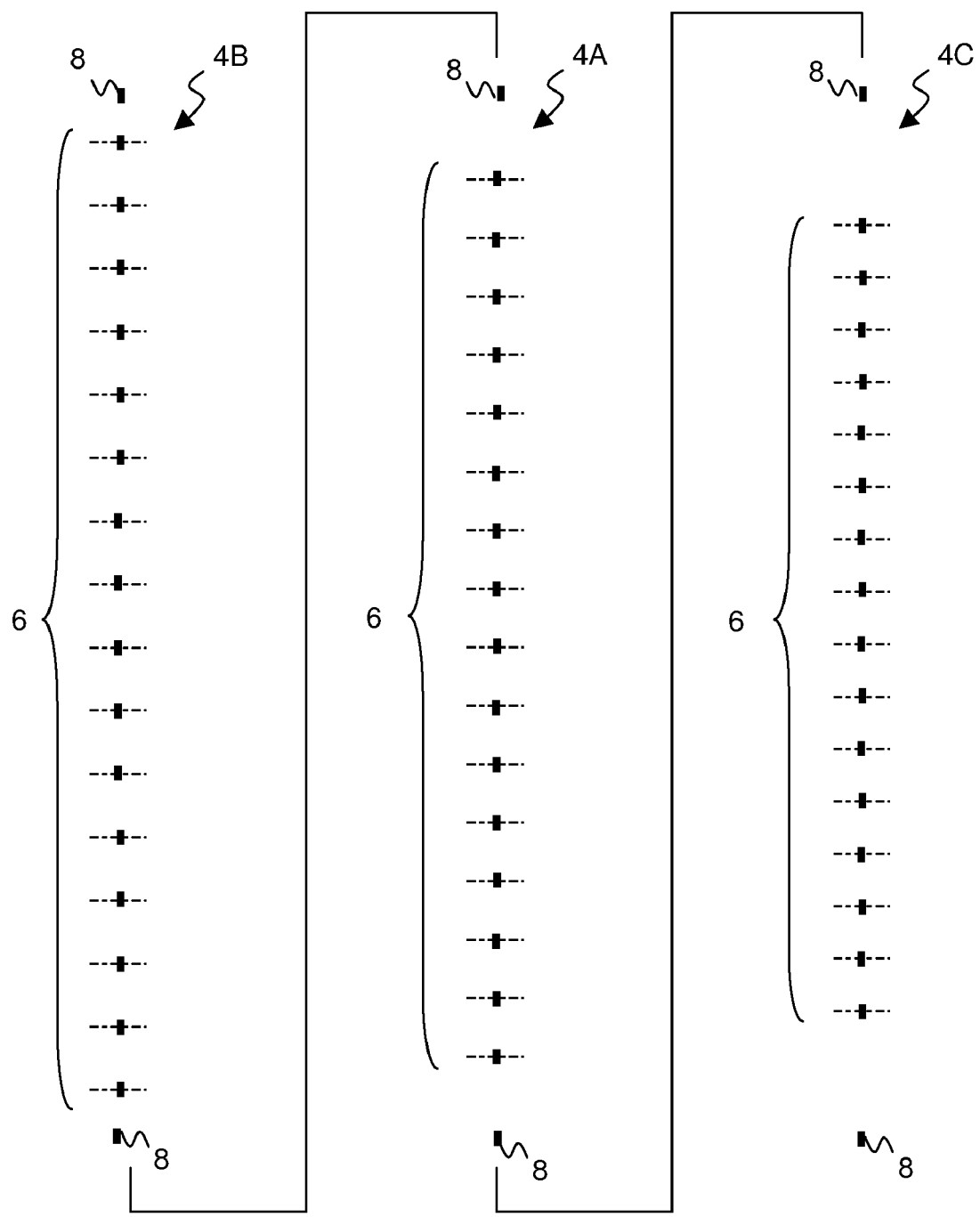
FIG. 8 is an enlarged view of the tape head module of FIG. 6 showing an implementation wherein the module includes arrays of read transducer elements.
Figure 9:
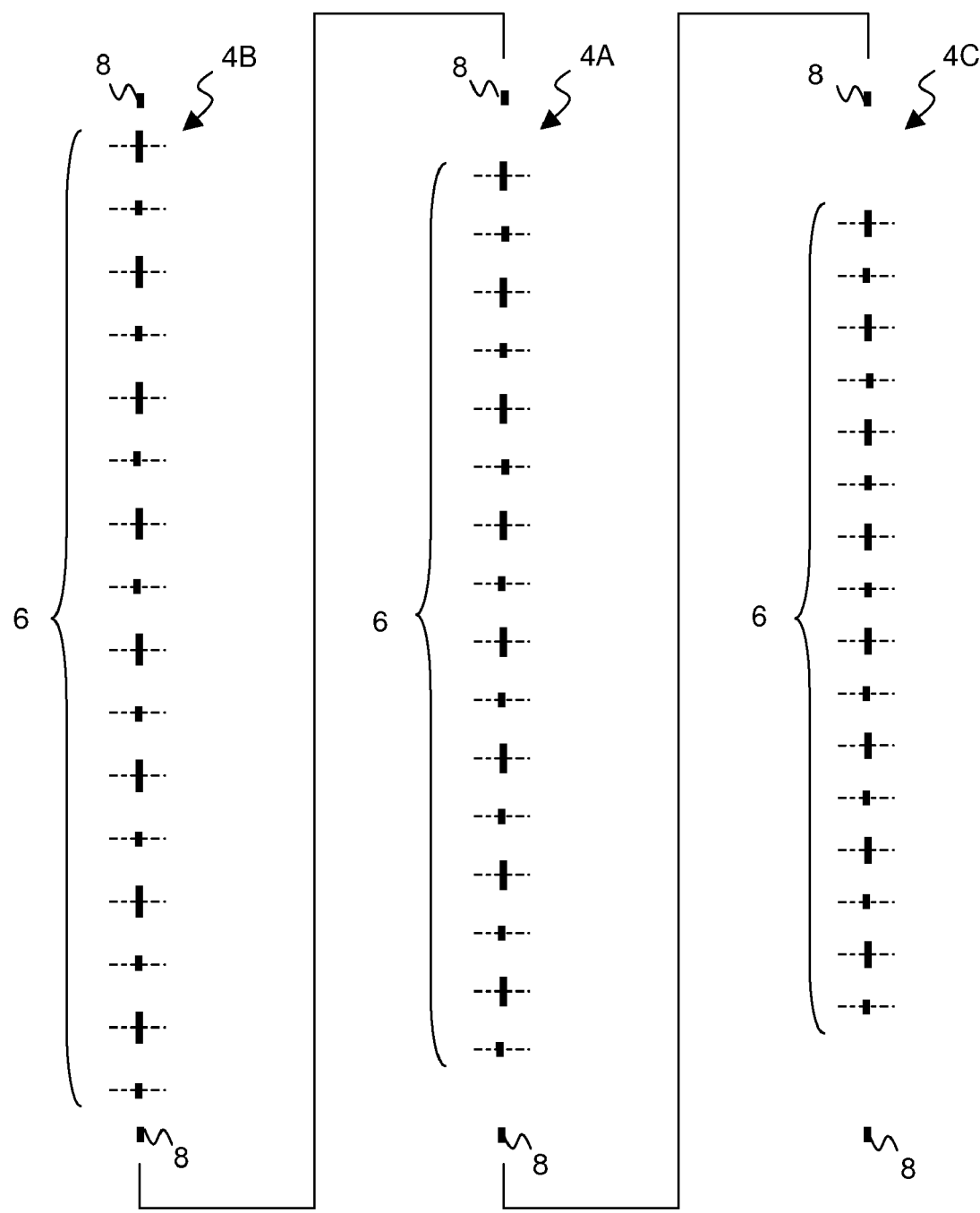
FIG. 9 is an enlarged view of the tape head module of FIG. 6 showing an implementation wherein the module includes arrays of interleaved read and write transducer elements.
Figure 10:
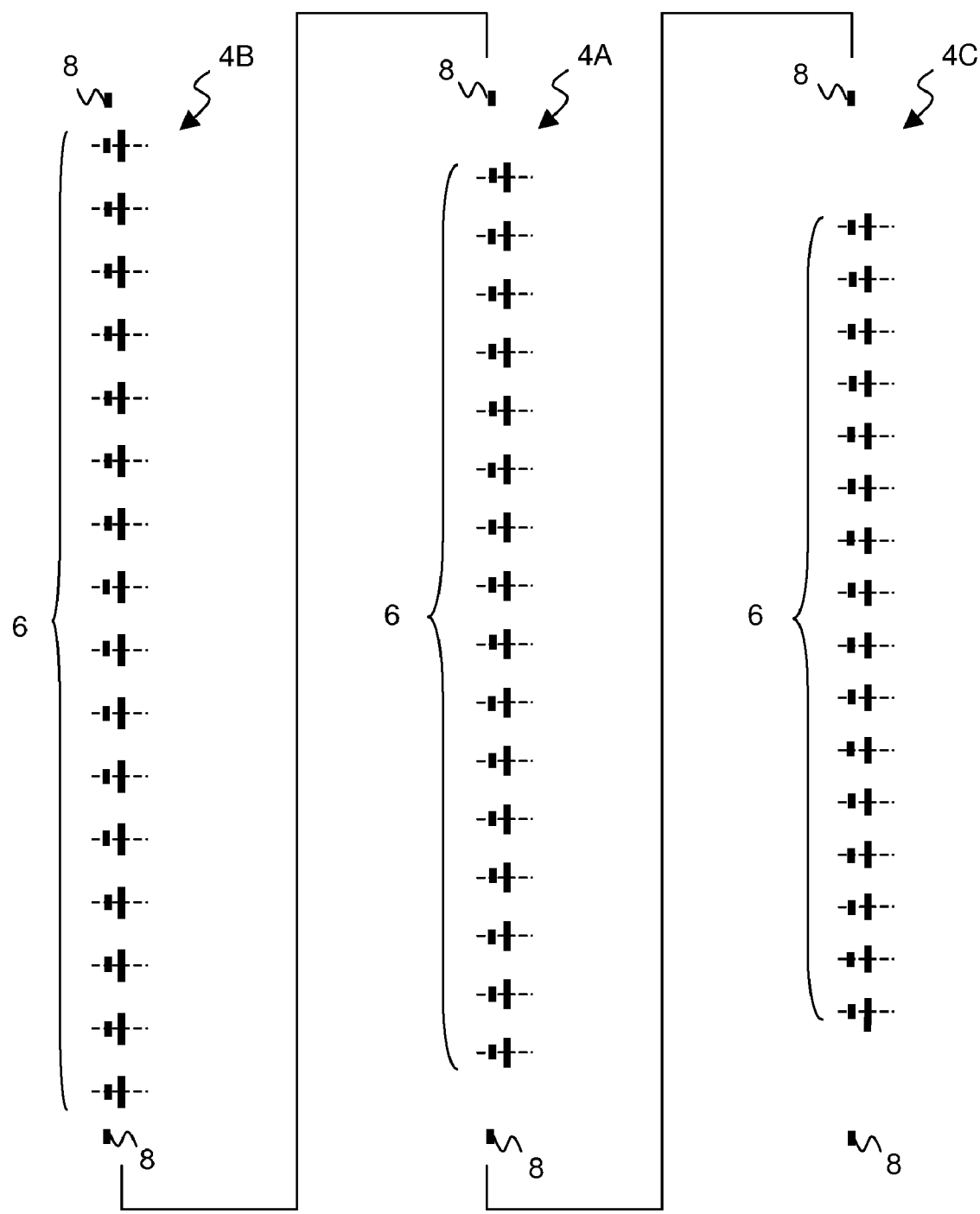
FIG. 10 is an enlarged view of the tape head module of FIG. 6 showing an implementation wherein the module includes arrays of piggy backed read and write transducer elements.

Turning now to FIGS. 7-10, the transducer arrays 4A, 4B and 4C may each include one or both of write transducer elements and read transducer elements. FIG. 7 illustrates a configuration wherein the data transducers 6 of the transducer arrays 4A, 4B and 4C are all write transducers. FIG. 8 illustrates a configuration wherein the data transducers 6 of the transducer arrays 4A, 4B and 4C are all read transducers. FIG. 9 illustrates a configuration wherein the data transducers 6 of the transducer arrays 4A, 4B and 4C are interleaved read and write transducers. FIG. 10 illustrates a configuration the data transducers 6 of the transducer arrays 4A, 4B and 4C are piggy backed read and write transducers.

Figure 11:
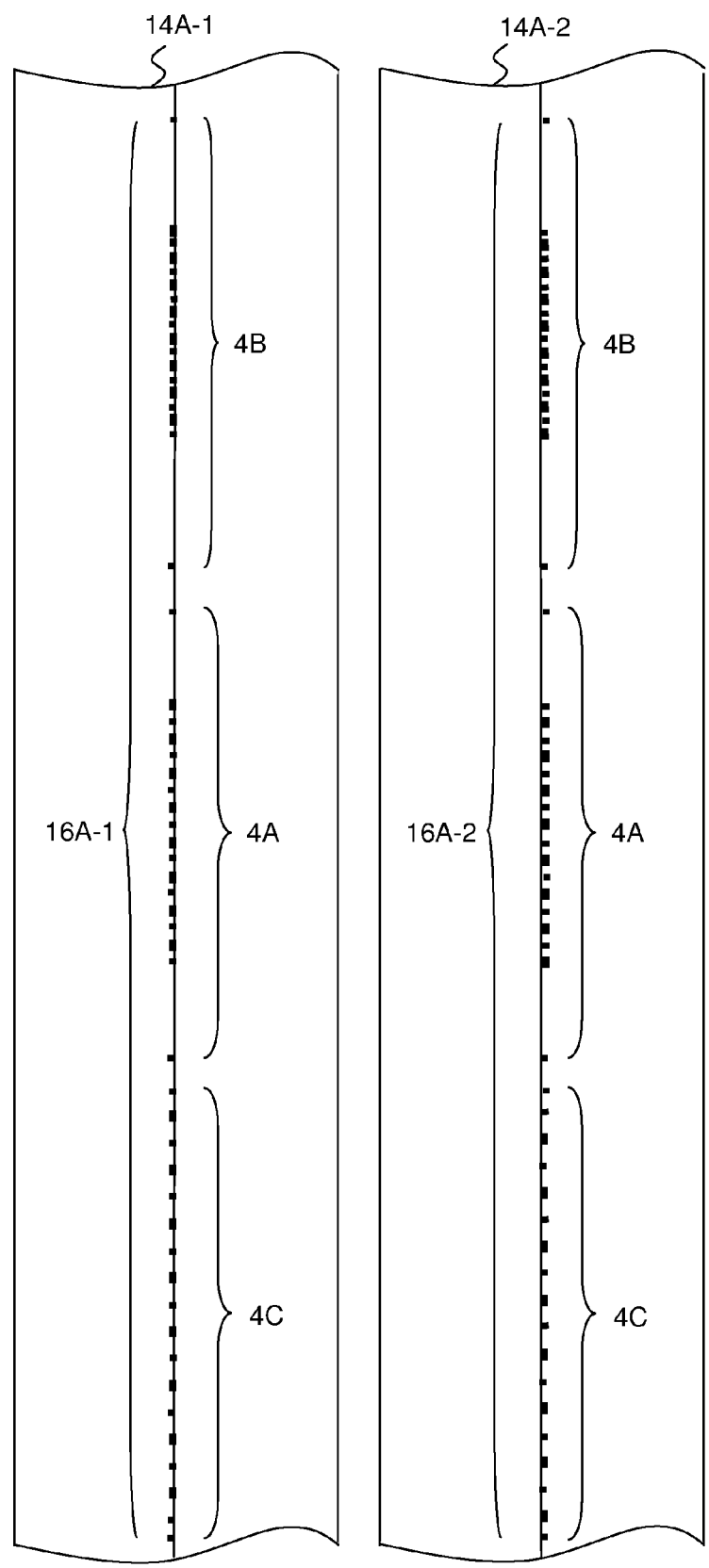
FIG. 11 is a partial plan view showing the tape bearing surfaces of two tape head modules according to FIG. 6, wherein each module has arrays of interleaved read and write elements.
Figure 12:
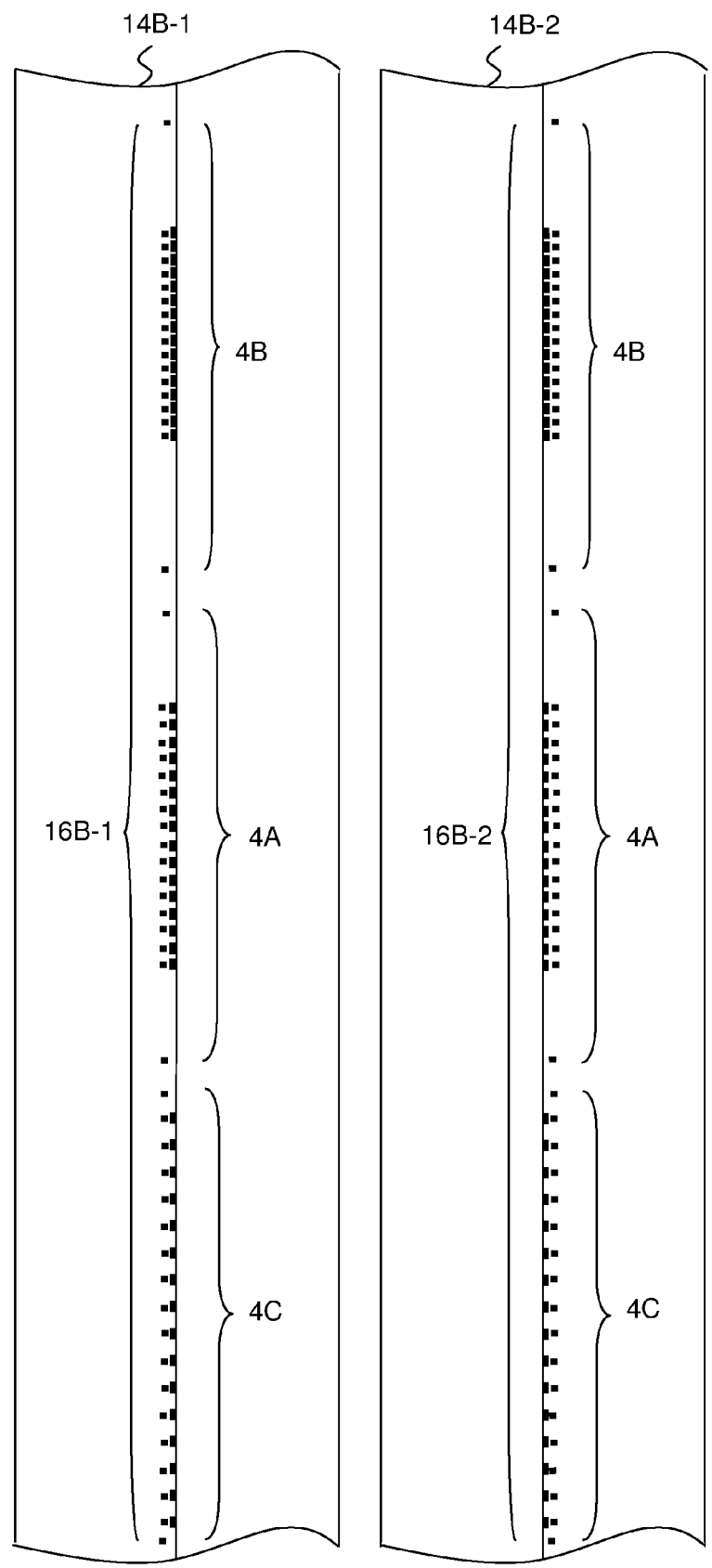
FIG. 12 is a partial plan view showing the tape bearing surfaces of two tape head modules according to FIG. 6, wherein each module has arrays of piggy backed read and write elements.
Figure 13:
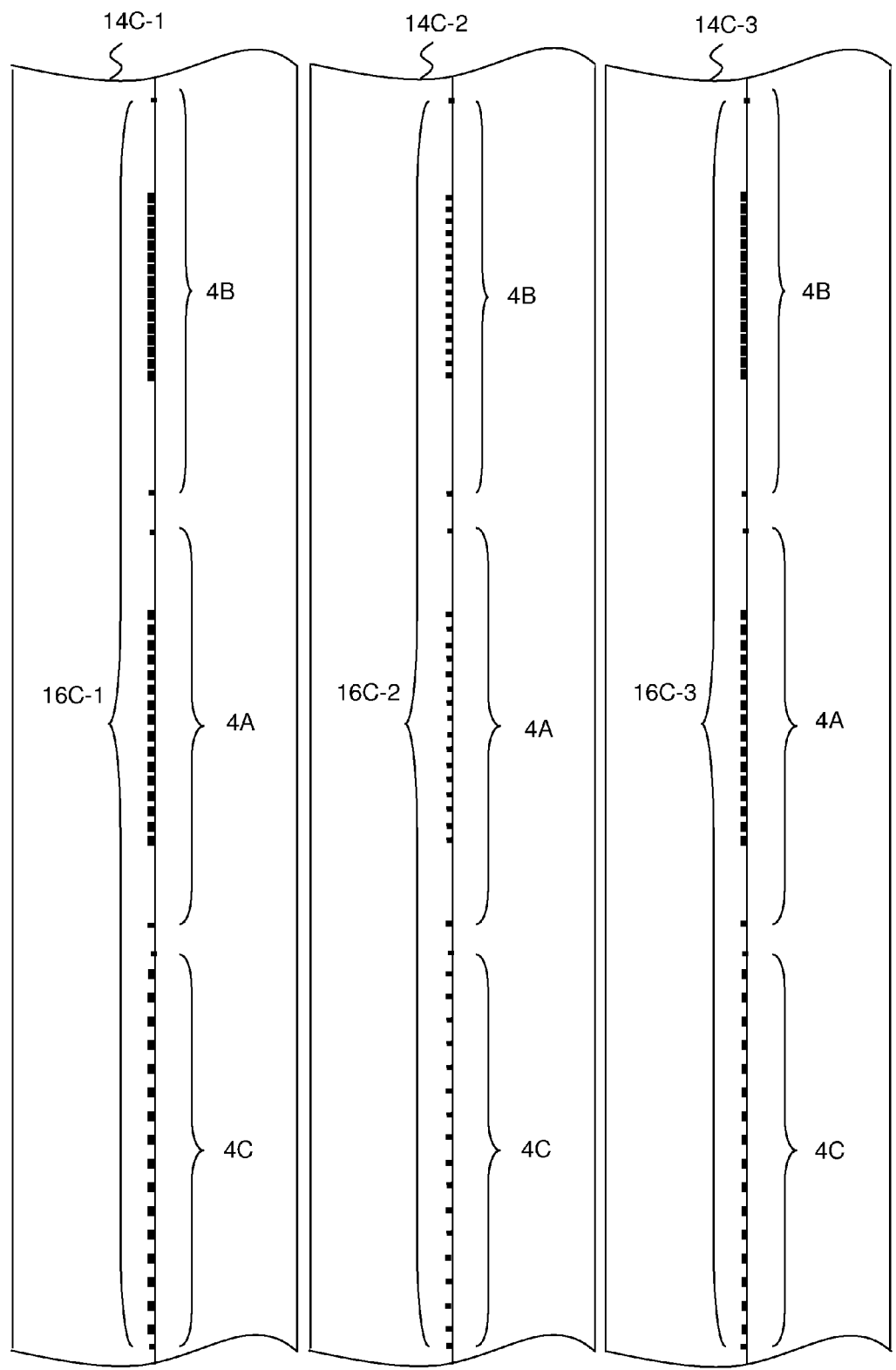
FIG. 13 is a partial plan view showing the tape bearing surfaces of three tape head modules according to FIG. 6, wherein two modules have arrays of write elements and a third module disposed between the write element arrays has arrays of read elements.

Turning now to FIGS. 11-13, the transducer arrays 4A, 4B and 4C may be arranged into various array groups 16 formed on plural modules 14. Each array group comprises two or more arrays arranged in a cross-track direction (as described above) or side-by-side (as described below in connection with FIG. 14). For example, as shown in FIG. 11, the tape head 2 may include a first array group 16A-1 on a first tape head module 14A-1 and a second array group 16A-2 on a second tape head module 14A-2. In this two-module configuration, the first and second array groups 16A-1 and 16A-2 each comprise read and write transducer elements arranged in an interleaved configuration. The array groups 16A-1 and 16A-2 are designed so that there will be one write transducer and one read transducer over each data track being transduced on a tape. When the tape moves from left to right in FIG. 11, the write transducers of an array 4A, 4B or 4C of the array group 16A-1 will write data tracks while the read transducers of a corresponding array 4A, 4B or 4C of the array group 16A-2 can be used to read-verify the data that was written. The roles of the array groups are reversed when the tape moves from right to left in FIG. 11.

Another two-module configuration is shown in FIG. 12. Here, the tape head 2 include a first array group 16B-1 on a first tape head module 14B-1 and a second array 16B-2 group on a second tape head module 14B-2. In this two-module configuration, the first and second array groups 16B-1 and 16B-2 each comprise read and write transducer elements arranged in a piggy backed configuration. The array groups 16B-1 and 16B-2 are designed so that there will be one write transducer and one read transducer over each data track on a tape. When the tape moves from left to right in FIG. 12, the write transducers of an array 4A, 4B or 4C of the array group 16B-1 will write data tracks while the read transducers of a corresponding array 4A, 4B or 4C of the array group 16B-2 can be used to read-verify the data that was written. The roles of the array groups are reversed when the tape moves from right to left in FIG. 12.

As shown in FIG. 13, the tape head 2 may alternatively include a first array group 16C-1 on a first tape head module 14C-1, a second array group 16C-2 on a second tape head module 14C-2, and a third array group 16C-3 on a third tape head module 14C-3. In this three-module configuration, the first and third array groups 16C-1 and 16C-3 may comprise write transducer elements and the second array group 16C-2 may comprise read transducer elements. The second tape head module 14C-2 may be disposed between the first and third tape head modules 14C-1 and 14C-3. The array groups 16C-1, 16C-2 and 16C-3 are designed so that there will be two write transducers and one read transducer over each data track on a tape. When the tape moves from left to right in FIG. 13, the write transducers of an array 4A, 4B or 4C of the array group 16C-1 will write data tracks while the read transducers of a corresponding array 4A, 4B or 4C of the array group 16C-2 can be used to read-verify the data that was written. When the tape moves from right to left in FIG. 12, the write transducers of an array 4A, 4B or 4C of the array group 16C-3 will write data tracks while the read transducers of a corresponding array 4A, 4B or 4C of the array group 16C-2 can be used to read-verify the data that was written.

During use of the tape head 2, data may be conveniently written or read on a magnetic recording tape while accommodating tape dimensional changes. Before reading or writing data, a dimensional condition of the tape is determined. This can be determined by streaming the tape over the nominal array 4A of the tape head 2 and reading prerecorded servo markings on the tape. If conventional timing-based servoing is used, the servo read transducers 8 will detect if the servo track markings are nominally spaced depending on whether a nominal servo mark timing condition can be achieved on both tracks. If not, a tape expansion or contraction condition may be determined from the timing change and the orientation of the timing servo marks. This information is used to select one of the transducer arrays 4A, 4B or 4B for transducing according to which of the transducer spacing distances most closely corresponds to the tape dimensional condition.

Figure 14:
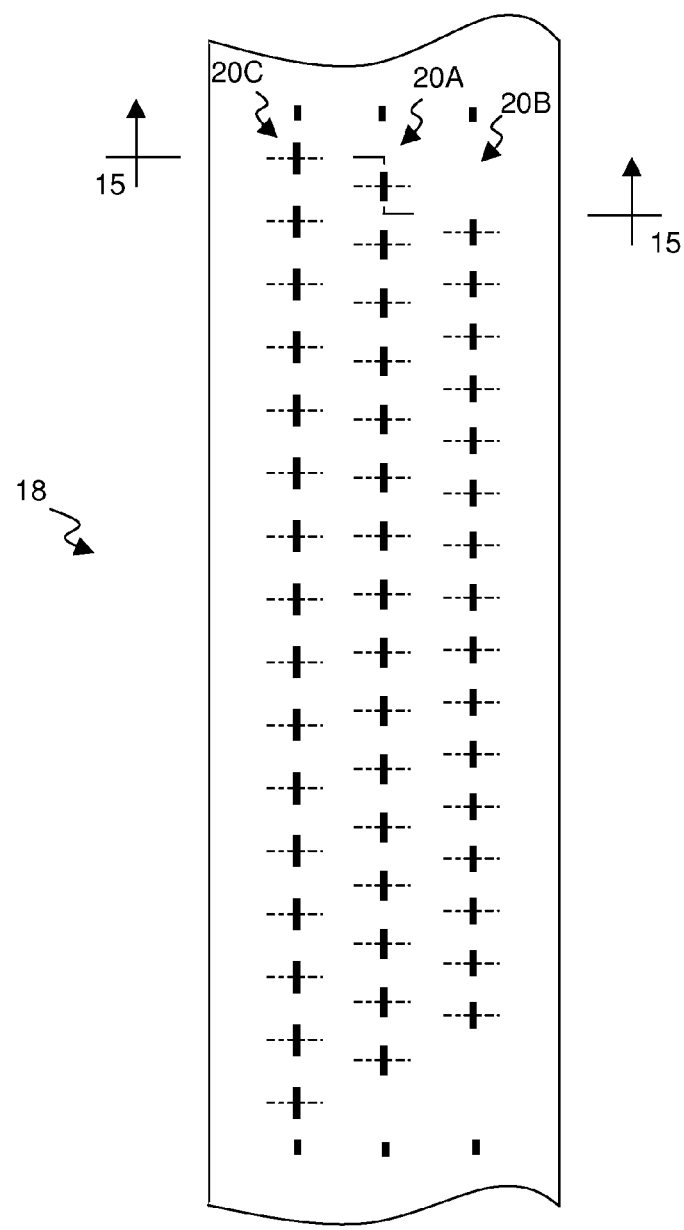
FIG. 14 is a partial plan view showing the tape bearing surface of a tape head module constructed in accordance with another exemplary disclosed embodiment.
Figure 15:
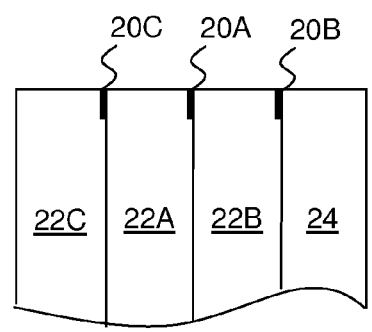
FIG. 15 is a cross-sectional view taken along line 15-15 in FIG. 14.

Turning now to FIG. 14, a tape head 18 represents an alternative to the embodiment of FIG. 6 wherein two or more arrays of transducer elements having different transducer spacing distances are aligned in a direction of tape motion. By way of example only, three arrays 20A, 20B and 20C are shown, with the array 20A utilizing a nominal transducer spacing distance, the array 20B utilizing a reduced transducer spacing distance, and the array 20C utilizing an enlarged transducer spacing distance. As shown in FIG. 15, the transducer arrays 20A, 20B and 20C can be respectively fabricated on substrate layers 22A, 22B and 22C. A closure 24 may be bonded to the transducer side of the substrate layer 22B. As in the case of the tape head 2, the tape head 18 can be fabricated with write transducers, read transducers, or a combination of both in either an interleaved or piggy backed construction. As also described above in connection with the tape head 2, the transducer arrays 20A, 20B and 20C of the tape head 18 can be disposed on plural modules.

Figure 16:
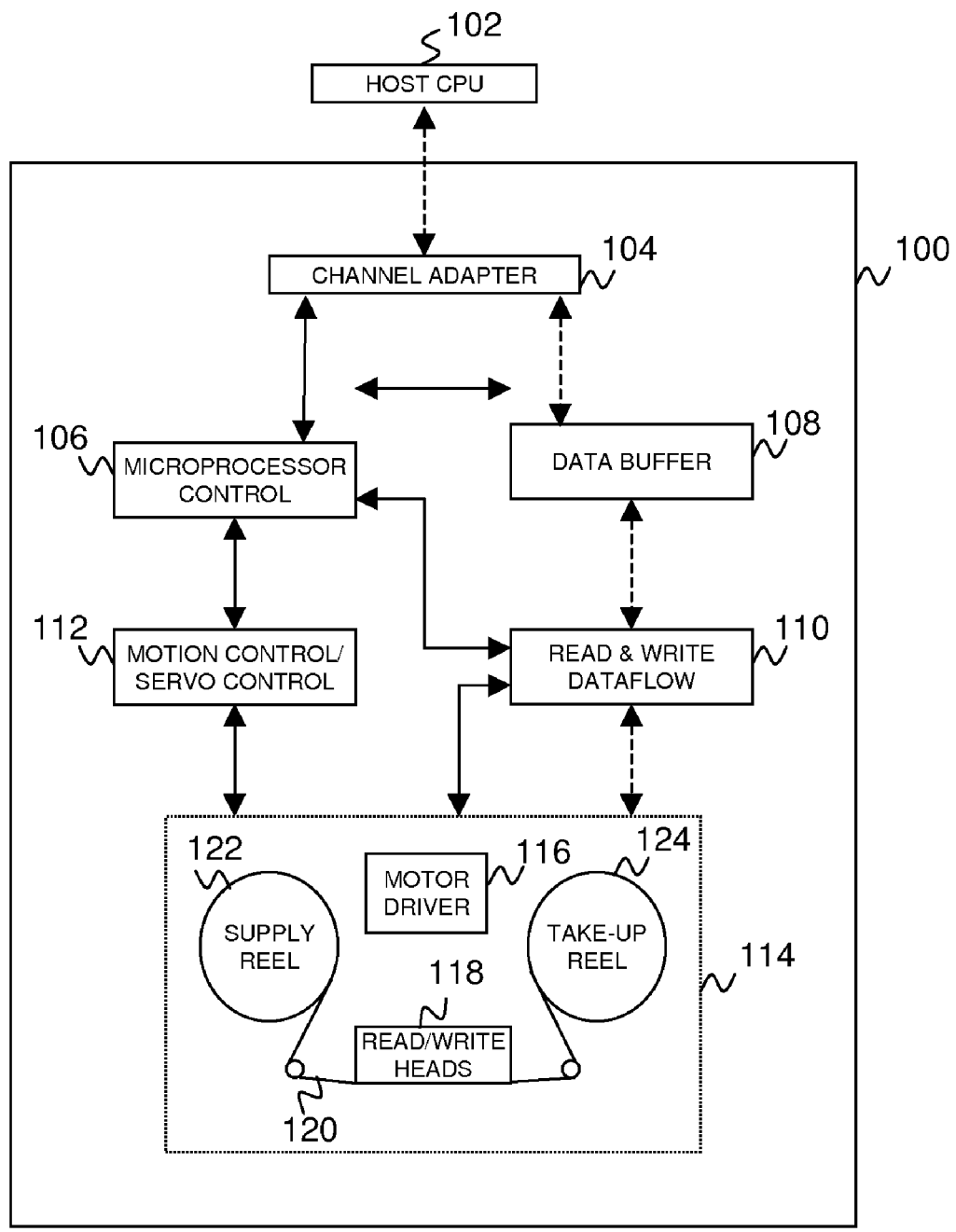
FIG. 16 is a functional block diagram showing a tape drive data storage device adapted for use with the present invention.

Turning to FIG. 16, the inventive concepts herein described may be embodied in a tape drive data storage device (tape drive) 100 for storing and retrieving data by a host data processing device 102, which could be a general purpose computer of other processing apparatus adapted for data exchange with the tape drive 100. The tape drive 100 includes plural components providing a control and data transfer system for reading and writing host data on a magnetic tape medium. By way of example only, those components may conventionally include a channel adapter 104, a microprocessor controller 106, a data buffer 108, a read/write data flow circuit 110, a motion control system 112, and a tape interface system 114 that includes a motor driver circuit 116 and a read/write head unit 118.

The microprocessor controller 106 provides overhead control functionality for the operations of the tape drive 100. As is conventional, the functions performed by the microprocessor controller 106 are programmable via microcode routines (not shown) according to desired tape drive operational characteristics. During data write operations (with all dataflow being reversed for data read operations), the microprocessor controller 106 activates the channel adapter 104 to perform the required host interface protocol for receiving an information data block. The channel adapter 104 communicates the data block to the data buffer 108 that stores the data for subsequent read/write processing. The data buffer 108 in turn communicates the data block received from the channel adapter 104 to the read/write dataflow circuitry 110, which formats the device data into physically formatted data that may be recorded on a magnetic tape medium. The read/write dataflow circuitry 110 is responsible for executing read/write data transfer operations under the control of the microprocessor controller 106. Formatted physical data from the read/write data flow circuitry 110 is communicated to the tape interface system 114. The latter includes one or more read/write heads in the read/write head unit 118, and drive motor components (not shown) for performing forward and reverse movement of a tape medium 120 mounted on a supply reel 122 and a take-up reel 124. The drive components of the tape interface system 114 are controlled by the motion control system 112 and the motor driver circuit 116 to execute such tape movements as forward and reverse recording and playback, rewind and other tape motion functions. In addition, in multi-track tape drive systems, the motion control system 112 transversely positions the read/write heads relative to the direction of longitudinal tape movement in order to record data in a plurality of tracks.

Figure 17:
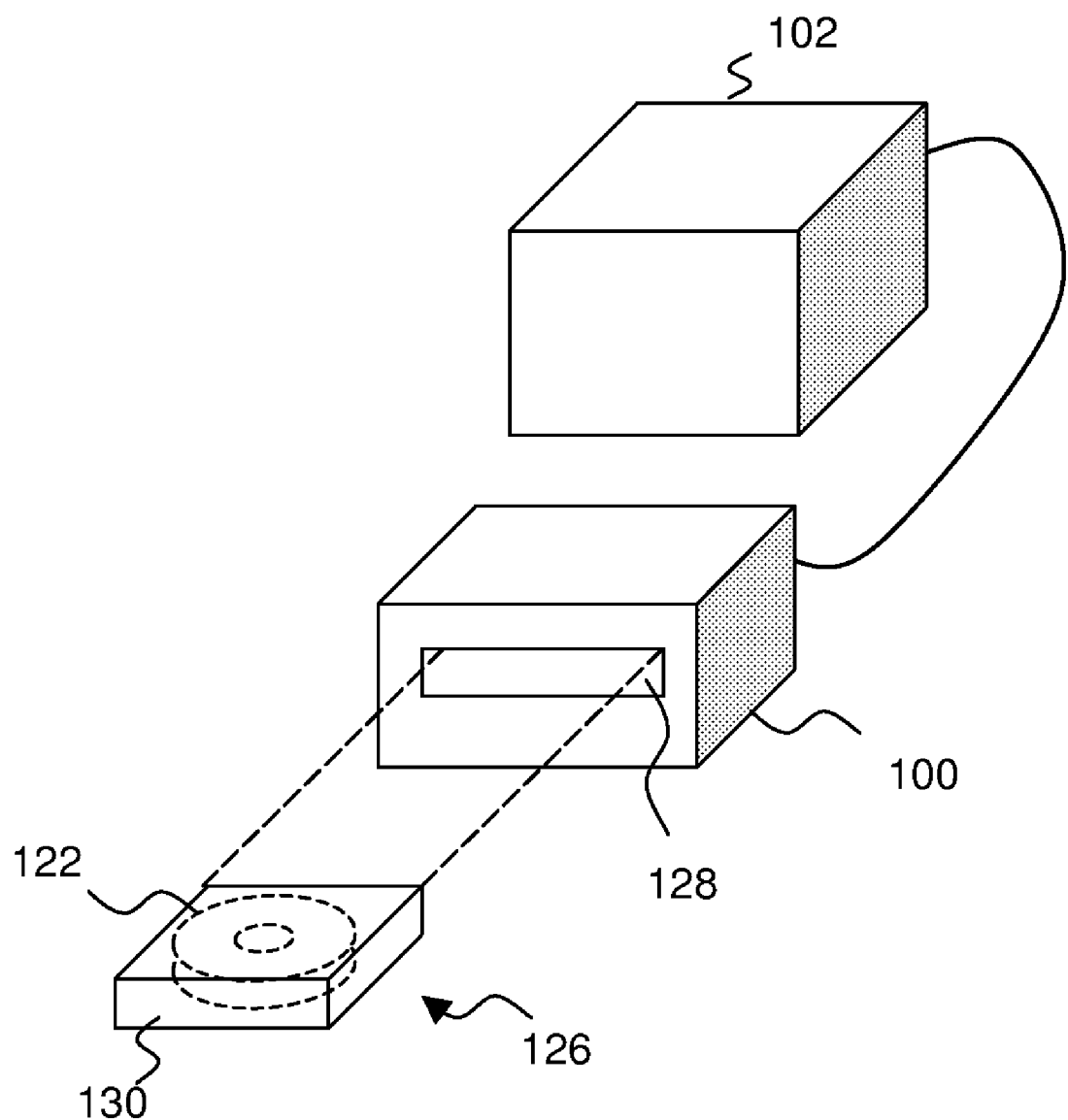
FIG. 17 is a perspective view showing an exemplary construction of the tape drive storage device of FIG. 16 for use with cartridge-based tape media.

In most cases, as shown in FIG. 17, the tape medium 120 will be mounted in a cartridge 126 that is inserted in the tape drive 100 via a slot 128. The tape cartridge 126 comprises a housing 130 containing the magnetic tape 120. The supply reel 122 is shown to be mounted in the housing 130.

Accordingly, a tape head, method and tape drive have been disclosed that are capable of accommodating temperature-induced tape dimensional changes. While various embodiments of the invention have been shown and described, it should be apparent that many variations and alternative embodiments could be implemented in accordance with the teachings herein. It is understood, therefore, that the invention is not to be in any way limited except in accordance with the spirit of the appended claims and their equivalents.

What is claimed is:

1. A method for transducing data on a magnetic recording tape while accommodating tape dimensional changes, comprising:

streaming said tape across a tape head that comprises plural arrays of transducer elements having different transducer spacing distances corresponding to different track spacing distances to be transduced;

a first one of said arrays having a nominal transducing spacing distance that corresponds to a nominal track spacing distance for use when said tape is in a nominal dimensional condition with nominal track spacing;

a second one of said arrays having a reduced transducer spacing distance corresponding to a reduced track spacing distance for use when said tape is in a reduced dimensional condition with reduced track spacing;

a third one of said arrays having an enlarged transducer spacing distance corresponding to an enlarged track spacing distance for use when said tape is in an enlarged dimensional condition with enlarged track spacing;

determining a dimensional condition of said tape; and selecting one of said transducer arrays for transducing according to which of said transducer spacing distances most closely corresponds to said tape dimensional condition.

2. A method in accordance with claim 1 wherein determining said tape dimensional condition comprises reading prerecorded servo markings on said tape.

3. A method in accordance with claim 2 wherein said servo markings are read by a pair servo read transducers in each array that are equally spaced from each other in each array.

4. A method for transducing data on a magnetic recording tape while accommodating tape dimensional changes, comprising:

streaming said tape across a tape head that comprises two or more arrays of transducer elements having different transducer spacing distances corresponding to different track spacing distances to be transduced;

a first one of said arrays having a nominal transducing spacing distance that corresponds to a nominal track spacing distance for use when said tape is in a nominal dimensional condition with nominal track spacing;

a second one of said transducer arrays having a reduced transducer spacing distance corresponding to a reduced track spacing distance for use when said tape is in a reduced dimensional condition with reduced track spacing; and wherein said tape is additionally transduced by said first array when said tape track spacing distance is enlarged due to tape expansion while stretching said tape in a longitudinal direction to reduce said enlarged tape track spacing distance to a nominal tape track spacing distance.

5. In a tape drive, a tape head for transducing data on a magnetic recording tape that is subject to tape dimensional changes, comprising:

plural tape head modules, each tape head module comprising:

a first array of transducer elements having transducer elements spaced from each other by a first transducer spacing distance that corresponds to a nominal tape track spacing distance;

a second array of transducer elements spaced from each other by a second transducer spacing distance that corresponds to a reduced tape track spacing distance caused by tape shrinkage; and a third array of transducer elements spaced from each other by a third transducer spacing distance that corresponds to an enlarged tape track spacing distance caused by tape expansion; and wherein said arrays are spaced from each other in a cross-track direction.

* * * * *